United States Patent [19]

La Bar

[11] 4,088,502

[45] May 9, 1978

[54] CORROSION RESISTANT CASTABLE REFRACTORY MIX

[75] Inventor: Richard G. La Bar, Export, Pa.

[73] Assignee: Aluminum Company of America, Pittsburgh, Pa.

[21] Appl. No.: 759,984

[22] Filed: Jan. 17, 1977

Related U.S. Application Data

[63] Continuation-in-part of Ser. No. 639,993, Dec. 12, 1975, abandoned.

[51] Int. Cl.² .................. C04B 35/02; C04B 7/32; C04B 35/02
[52] U.S. Cl. ..................... 106/64; 106/104; 106/55
[58] Field of Search ............... 106/64, 104, 63, 55

[56] References Cited

U.S. PATENT DOCUMENTS

| | | | |
|---|---|---|---|
| 2,516,892 | 8/1950 | Lobaugh | 106/64 |
| 2,874,071 | 2/1959 | Kadisch et al. | 106/64 X |
| 2,997,402 | 8/1961 | McDonald et al. | 106/63 |
| 3,253,936 | 5/1966 | Weindel | 106/64 |
| 3,471,306 | 10/1969 | Rubin et al. | 106/63 |

Primary Examiner—Patrick P. Garvin
Assistant Examiner—William G. Wright
Attorney, Agent, or Firm—John P. Taylor

[57] ABSTRACT

A corrosion resistant castable refractory mix is provided comprising a particulate mixture capable of mixture with water to form a castable refractory having enhanced corrosion resistance to molten aluminum. The mixture consists essentially of 20–34 parts by weight calcium aluminate, 6–10 parts by weight of a zinc borosilicate frit, and 60–70 parts by weight fused silica. The zinc borosilicate frit consists essentially of 50–60% by weight zinc oxide, 20–40% by weight boron oxide, 8–12% by weight silicon oxide, and 0–10% by weight aluminum oxide with less than 0.5% by weight of other impurities. The refractory mix contains not greater than 1% by weight impurities.

6 Claims, 5 Drawing Figures

CORROSION RESISTANT CASTABLE REFRACTORY MIX

CROSS-REFERENCE TO RELATED APPLICATIONS

This application is a continuation-in-part of U.S. patent application Ser. No. 639,993, filed Dec. 12, 1975 now abandoned.

BACKGROUND OF THE INVENTION

This invention relates to castable refractory mixtures. More particularly, it relates to a castable refractory mixture having enhanced corrosion resistance to molten aluminum.

In the processing of metal such as aluminum and aluminum alloys for casting or purification, the metal is generally melted in a furnace and conveyed in troughs lined with suitable refractory material to inhibit attack by the molten aluminum. Calcium aluminate is known as a good refractory material from the standpoint of corrosion resistance to molten aluminum. However, calcium aluminate has a high thermal conductivity and a high thermal expansion coefficient.

It is known to modify calcium aluminate with other materials which counter the deleterious effects noted above. For example, Kadisch et al. U.S. Pat. No. 2,874,071 teaches a mixture of calcium aluminate with fused silica. The patentees further state that the material may be made much more refractory by an additional treatment involving dipping, spraying, or brushing the surface thereof with a plastic composition containing super-refractory powders or mixtures of such powders. The patentees state that such super-refractory powders are made by specially milling stabilized fused zirconium or alumina. They further state that refractory borides, nitrides, or carbides and mixtures thereof of silicon, molybdenum and chromium can also be applied as a coating.

While the use of calcium aluminate-silica mixtures is preferred to pure calcium aluminate because of the lower thermal conductivity of silica and the lower shrinkage of the mixture, the success of the mixture apparently depends on the bond between the calcium aluminate and silica which, if broken, permits metal attack of the silica. It is known that the use of boron oxide ($B_2O_3$) together with silica and calcium oxide and aluminum oxide provides a refractory material which prevents metal attack of siliceous aggregates. However, the prior art incorporated the boron oxide into the mixture by providing a fused or glassy matrix of calcium oxide, boron oxide, and aluminum oxide For example, McDonald et al U.S. Pat. No. 2,997,402 teaches a refractory which comprises a homogeneous vitreous product and a refractory aggregate wherein the homogenous vitreous product is a fused mixture of calcium oxide, boron oxide, and aluminum oxide and the refractory aggregate is principally a mixture of aluminum oxide and silicon dioxide is comminuted form. McDonald et al also suggest that up to 15% by weight of a additional metal oxide component can also be incorporated in the glass such as the oxides of magnesium, barium, beryllium, zirconium, zinc, vanadium, silicon, chromium, and molybdenum.

Rubin et al U.S. Pat. No. 3,471,306 mixes bondforming components containing $Al_2O_3$, $B_2O_3$, and CaO with a pre-calcined granular grog containing $SiO_2$ in excess of $Al_2O_3$ to form a calcium boroaluminate bond in situ.

While the use of such materials can result in satisfactory mixtures, fritted or glassy matrices comprising calcium oxide, boron oxide and aluminum oxide are not easily formed. For example, in the formation of the homogeneous vitreous product of McDonald et al. care must be taken to minimize the water solubility of the frit wherein the boron oxide and the calcium oxide might otherwise be leached out. On the other hand, the formation of a calcium-boroaluminate bond in situ as in Rubin et al. is not easily achieved because of added complications in firing due to the presence of the aggregate (e.g. one cannot melt the bond-forming components as in McDonald et al to ensure formation of a homogeneous stable mixture).

It is therefore an object of this invention to provide a refractory mixture wherein a boron oxide-containing material is used in the form of a zinc borosilicate glass frit having a low content (less than 0.5% by weight) of impurities such as alkali and alkaline earth additives which could otherwise be leached out of the frit in aqueous systems commonly used to form refractories.

SUMMARY OF THE INVENTION

In accordance with the invention, a particulate mixture capable of mixture with water to form a castable refractory having enhanced corrosion resistance to molten aluminum is provided consisting essentially of 90–94% by weight refractory material and 6–10% by weight zinc borosilicate frit consisting essentially of 50–60% by weight zinc oxide, 20–40% by weight boron oxide, 8–12% by weight silicon oxide, and 0–10% by weight aluminum oxide with less than 0.5% by weight impurities and wherein the total amount of impurities within the refractory material is not greater than 1% by weight. In a preferred embodiment, the refractory mixture consists essentially of 24–34 parts by weight calcium aluminate, 60–70 parts by weight fused silica, and 6–10 parts by weight of a zinc borosilicate frit consisting essentially of 50–60% by weight zinc oxide, 30–38% by weight boron oxide, and 8–12% by weight silicon oxide with less than 0.5% by weight impurities in the frit and wherein the refractory mixture has a total impurity content of 1% by weight.

DESCRIPTION OF THE INVENTION

In accordance with the invention, the corrosion resistant castable refractory mix consists essentially of three principal ingredients: calcium aluminate, fused silica, and zinc borosilicate with a total impurities content of not greater than 1% by weight.

In a particularly preferred embodiment of the invention, the calcium aluminate comprises a mixture of 75-83% by weight $Al_2O_3$ and 14-23% by weight CaO with a total impurities content of other oxides and ignition loss of not more than 3% by weight. An example of such a calcium aluminate is the calcium aluminate cement sold by Aluminum Company of America under the designation CA-25. The calcium aluminate is used in particulate form in a particle size range of about 90% by weight −325 mesh (U.S. Standard Sieve Series). The amount of calcium aluminate used in the mixture of the invention should be about 20-34% by weight and preferably 24-34 parts by weight of the total weight of the three ingredients.

The fused silica is used in a particle size range of about −4 mesh (U.S. Standard). Preferably, the silica particle mixture contains at least about 50% by weight particles of −10 to +325 mesh with the balance smaller. Most preferably, about 20-30% by weight of the particles are −10 to +20 mesh, about 15-25% by weight −20 to +100 mesh, and the balance −100 mesh. The total amount of particulate fused silica used should be approximately 60-70 parts by weight of the total weight of the three components of the mixture.

The borosilicate glass frit used in the invention consists essentially of a fused mixture of zinc oxide (ZnO), boron oxide ($B_2O_3$), and silicon dioxide ($SiO_2$). The amount of boron oxide in the frit should be 20-40 weight percent and preferably 30-38 weight percent. The amount of zinc oxide in the frit should be 50-60% by weight. The amount of silicon oxide in the frit should be 8-12% by weight. Aluminum oxide may be added as an optical ingredient up to 10% by weight. The total amount of other impurities such as alkali metal oxides, calcium oxide or the like should be less than 0.5% by weight to ensure a water solubility of the frit of less than 1% by weight and preferably 0.4-0.6% by weight to prevent adversely effecting rheological and hydraulic properties of the castable refractory. As is well known to those skilled in the art, the mixtures of oxides should be heated to a temperature sufficient to fuse them into a homogeneous glass mixture which is subsequently quenched to prevent crystallization (fritted) which would otherwise permit solubilizing of any of the ingredients therein in a subsequently formed hydraulic setting castable refractory. In accordance with the invention, the zinc borosilicate glass should be ground to a particle size range of at least −100 mesh and preferably −200 mesh (U.S. Standard).

Figure 1:
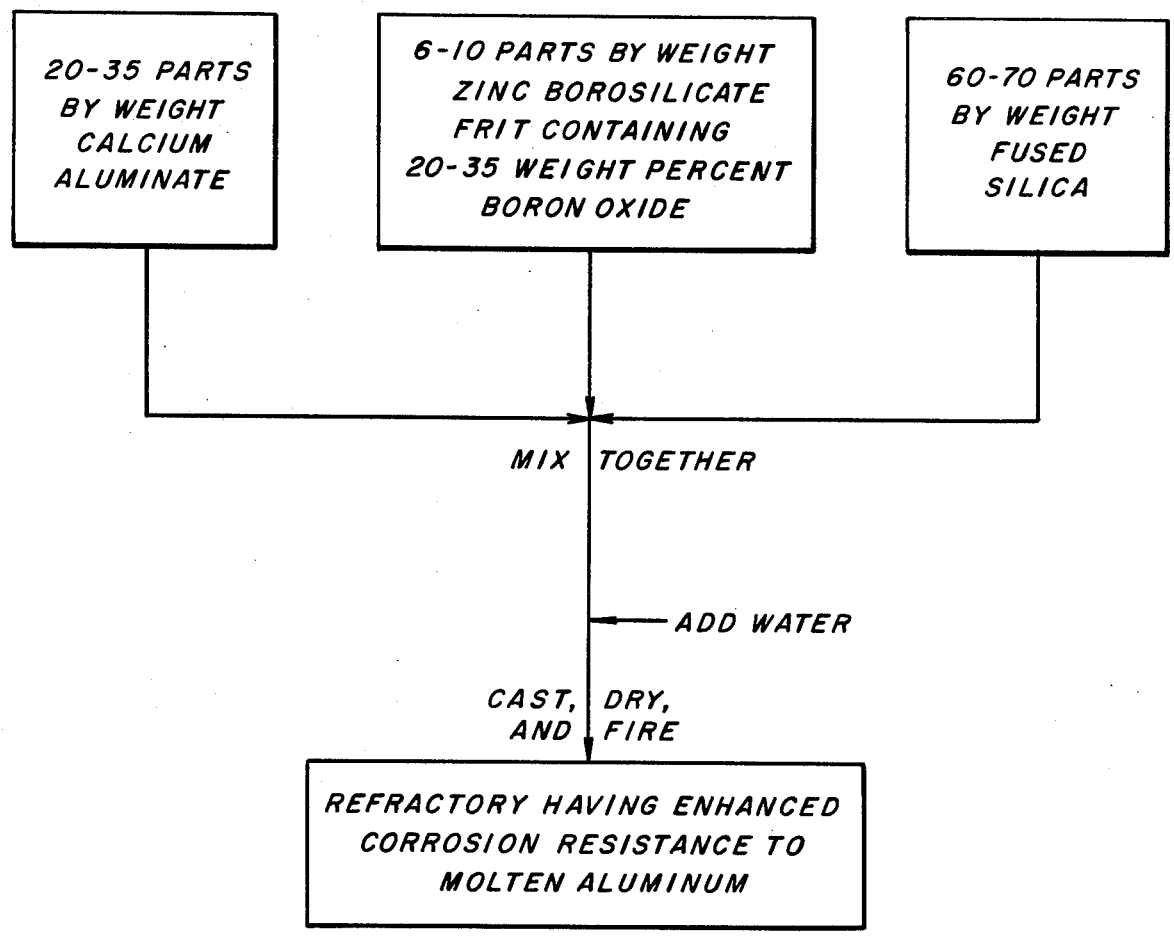
FIG. 1 is a flowsheet illustrating the invention.
Figure 4:
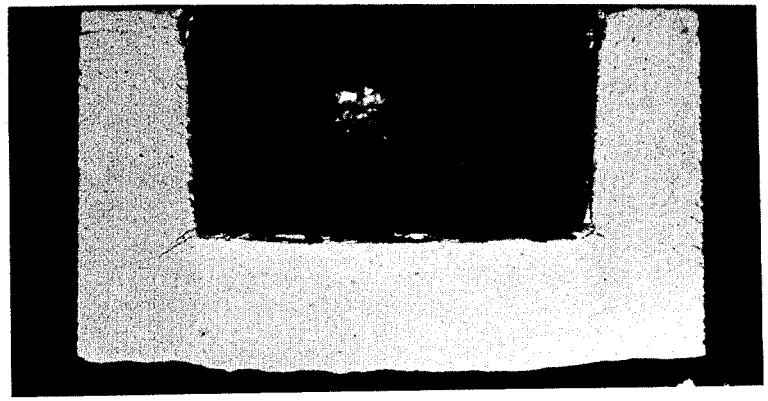
FIG. 4 is a photolithographic reproduction of a corrosion test specimen made using the refractory of the invention.
Figure 2:
FIG. 2 is a photolithographic reproduction of a cross section of a corrosion test specimen showing metal attack where a fused silica-calcium aluminate refractory was used.
Figure 3:
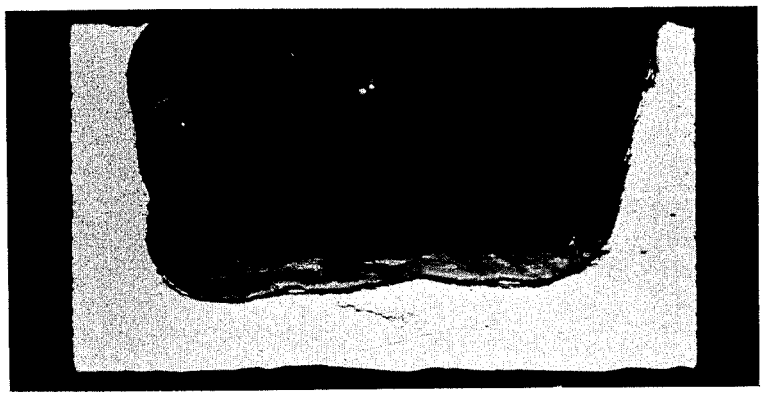
FIG. 3 is a photolithographic reproduction of a corrosion test specimen made using fused silica, calcium aluminate, and a zinc borosilicate frit wherein the amount of borate in the frit is less than that required in accordance with the invention.

The borosilicates frit content of the castable refractory mix should be about 6-10 parts by weight. Referring to the drawings, it can be seen from comparing FIGS. 2, 3, and 4 that when only 5% frit is used as in FIG. 3, the results are not significantly different from the mixture illustrated in FIG. 2 containing no borosilicate glass. However, as shown in FIG. 4, when a higher amount of borosilicate glass is used, the desired corrosion resistance is obtained. In the mixture illustrated in FIG. 4, 7% borosilicate was used.

Figure 5:
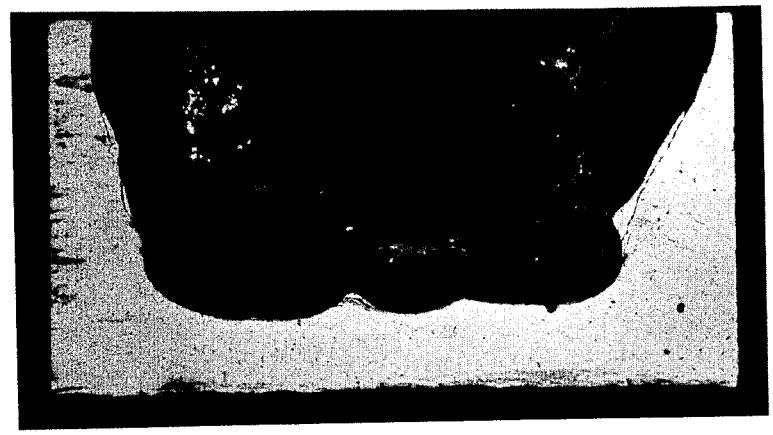
FIG. 5 is a photolithographic reproduction of a corrosion test specimen showing metal attack wherein a fused silica-calcium aluminate refractory contains zinc borosilicate frit in an amount less than that required in accordance with the invention.

Comparing FIG. 4 with FIG. 5, the same ratios of silica to calcium aluminate to zinc borosilicate frit were used, however, a different zinc borosilicate was used containing less than 20% by weight boron oxide in the boron oxide-silicon dioxide-zinc oxide mixture.

The following examples will serve to further illustrate the invention.

EXAMPLE I

A number of compositions, as shown in Table I, were formulated to test the efficacy of the invention including the operable parameters such as presence or absence of the borate, and amount of borate present in the frit. In each instance, the amounts shown are in parts by weight per hundred parts of the dry mixture. In each instance, sufficient water was added (11-18) parts per hundred parts of dry mixture) to provide the same consistency. The composition was cast as a cup; cured; and oven dried at 100° C and fired to 820° C. Following firing, molten aluminum (Aluminum Association Alloy 7075) heated to 820° C was poured into the refractory cup and maintained at this temperature for 72 hours. The molten aluminum was sampled for determination of alloy change and then poured out of the refractory cup and, after cooling, the refractory was cross-sectioned to observe the amount of the attack on the refractory by the molten metal. Under the title "Corrosion Test Results" in Table I the severity of the attack is shown in the line entitled "Penetration" and is a function of the penetration and silicon pick-up as noted in the next line.

TABLE I

| Sample No. | 1 | 2 | 3 | 4 | 5 | 6 | 7 | 8 |
|---|---|---|---|---|---|---|---|---|
| Fused Silica (parts per 100 parts of dry mix) | 69 | 62 | 62 | 62 | 64 | 66 | 68 | 64 |
| Calcium Aluminate (parts per 100 parts of dry mix) | 31 | 31 | 31 | 31 | 31 | 31 | 25 | 30 |
| Additives (parts per 100 parts of dry mix) | | | | | | | | |
| Zinc Borosilicate Frit with 18.6% $B_2O_3$ | | 7 | | | | | | |
| Zinc Borosilicate Frit with 32.5% $B_2O_3$ | | | | 7 | 5 | 3 | 7 | 6 |
| Zinc Alumina Silicate Frit (No Borate) | | | 7 | | | | | |
| Corrosion Test Results | | | | | | | | |
| Penetration | Severe | Severe | Severe | Negligible | Severe | Severe | None | None |
| Silicon Pick-up | 20 | .12 | 9.4 | .12 | 11 | 16 | .10 | .10 |

The results of Sample Nos. 1, 2, 4, and 5 are respectively illustrated in FIGS. 2-5 of the drawings. As can be seen from the table, when using at least 6% by weight of the frit containing 32.5% $B_2O_3$ the amount of attack by the molten aluminum was negligible with the best results obtained using the preferred distribution range of fused silica particle sizes. The effects of varying particle size distribution and cement content are shown in a few examples in Table II. The preferred distribution of particle size and cement content in Sample 8 provide low firing shrinkage, low porosity, and high strength.

TABLE II

| Sample No. | 1 | 4 | 7 | 8 |
|---|---|---|---|---|
| Fused Silica Grain (U.S. Standard Mesh Size) | | | | |
| −10 to +20 | — | — | — | 27 |
| −20 to +50 | 17 | 17 | 28 | 11 |
| −50 to +100 | 15 | 15 | 12 | 10 |
| −100 to +325 | 7 | — | 3 | 9 |
| −325 | 30 | 30 | 25 | 7 |
| Calcium Aluminate | 31 | 31 | 25 | 30 |
| Zinc Borosilicate Frit (32.5% $B_2O_3$) | — | 7 | 7 | 6 |
| Linear Firing Shrinkage (%) | 0.75 | 0.95 | 0.7 | 0.5 |
| Apparent Porosity (%) | 21 | 19 | 20 | 20 |
| Bulk Density (gm/cc) | 1.92 | 2.02 | 1.91 | 1.92 |
| Flexural Strength (megapascals) | 12.4 | 15.9 | 13.0 | 14.5 |

EXAMPLE II

A further comparison was made between the castable refractory mix of the invention using three commercially available fused silica refractory mixes labeled A, B, and C and Sample #8 of Example I. The procedures for corrosion testing outlined in Example I were repeated. In addition, physical properties of each of the refractories were measured. While it was noted that the corrosion resistance of commercial mixture A was measurably improved by the respective additions of $CaF_2$ and $H_3BO_3$, the overall rheological and hydraulic properties of those refractories were adversely affected. With respect to commercial mix C, it should be noted that the use of a calcium boroaluminate additive did provide improved corrosion resistance but did not provide the high strength and low porosity of Sample #8 made using the refractory mix and zinc borosilicate frit of the invention.

TABLE III

| Sample | A | A* | A** | B | C | #8 |
|---|---|---|---|---|---|---|
| Silica (in weight %) | 63 | | | 64 | 62 | 64 |
| Calcium Aluminate (in weight %) | 37 | | | 36 | 32 | 30 |
| Zinc Borosilicate (in weight %) | 0 | | | 0 | 0 | 6 |
| Calcium Boroaluminate (in weight %) | 0 | | | 0 | 6 | 0 |
| Physical Properties | | | | | | |
| Bulk Density (gm/cc) | 1.76 | | | 1.86 | 1.79 | 1.92 |
| Porosity (%) | 30 | | | 25 | 28 | 20 |
| Flexural Strength (megapascals) | 7.6 | | | 4.8 | 10.3 | 14.5 |
| Working Time at 21° C (mins.) | | 2–5 | No Set | | | 45–60 |
| Corrosion Test Results | | | | | | |
| Penetration | Severe | None | Negligible | Severe | None | None |
| Silicon Pick-up (%) | 18 | .01 | .06 | 20 | .12 | .10 |

*97 parts by weight A plus 3 parts by weight $CaF_2$
**95 parts by weight A plus 5 parts by weight $H_3BO_3$ While the teachings of this invention deal primarily with the use of a boron rich zinc silicate frit in fused-silica castable refractories, it will be readily apparent to those skilled in the art that other refractory materials may be substituted without departing from the spirit and concept of the invention. Such substitute refractory materials include mortars, plastics, and castables comprising silicon carbide, tabular alumina, fused alumina, mullite, refractory bauxite, fireclay, zircon, and/or kyanite aggregates in which the practice of the invention will enhance their corrosion resistance to molten aluminum and may also enhance their physical and thermal properties as well, particularly for use in aluminum melting and holding furnaces. Thus, the use of zinc borosilicate in the amount specified in combination with such materials should be deemed to be within the scope of the invention.

Thus the invention provides a zinc borosilicate frit wherein boric oxide is supplied in an inert form and the matrix bond of the resulting refractory is modified to minimize or eliminate thermal expansion mismatch between the bond and the aggregate. More specifically, the use of the preferred embodiment of this invention is designed for use in hydraulic setting refractories comprising calcium aluminate cement and fused-silica aggregate in such a manner that the zinc borosilicate frit: reacts with the fused-silica aggregate and calcium aluminate to produce the desire bonding matrix; does not react with or interfere with the hydraulic portion of the refractory or the rheology of the castable mixture; and forms a bonding matrix which permits stress relief through viscoelastic deformation at normal processing and use temperatures. Thus, the invention provides an improved hydraulic setting fused silica refractory whose properties are such that it can be also used in many critical applications where heretofore only certain asbestos-containing materials satisfied the performance criteria.

What is claimed is:

1. A particulate refractory mixture capable of mixture with water to form a castable refractory having enhanced corrosion resistance to molten aluminum consisting essentially of: 90–94% by weight refractory material and 6–10% by weight of a zinc borosilicate frit consisting essentially of 50–60% by weight zinc oxide, 20–40% by weight boron oxide, 8–12% by weight silicon oxide and 0–10% by weight aluminum oxide with less than 0.55% by weight impurities in the frit and not more than 1% by weight impurities in the refractory mixture.

2. The mixture of claim 1 wherein said zinc borosilicate frit has a particle size of not greater than −100 mesh.

3. The refractory mixture of claim 1 wherein said refractory material consists essentially of 24–34% by total weight calcium aluminate and 60–70% by weight fused silica, and the zinc borosilicate frit contains 50–60% by weight zinc oxide, 30–38% by weight boron oxide and 8–12% by weight silicon oxide.

4. A corrosion resistant castable refractory mix capable of mixture with water to form a castable refractory having enhanced corrosion resistance to molten aluminum consisting essentially of 20–34% by weight calcium aluminate, 6–10% by weight of a zinc borosilicate frit consisting essentially of zinc oxide, boron oxide, and silicon oxide with less than 0.5% by weight impurities, and 60-70% by weight fused silica.

5. The mixture of claim 4 wherein the particle size of the calcium aluminate is about 90% by weight −325 mesh (U.S. Standard), the particle size of the zinc borosilicate frit is not greater than −100 mesh (U.S. Standard), and the particle size of the fused silica is −4 mesh (U.S. Standard).

6. The mixture of claim 5 wherein the amount of calcium aluminate is 24–34 parts by weight.

* * * * *

UNITED STATES PATENT AND TRADEMARK OFFICE
CERTIFICATE OF CORRECTION

PATENT NO. : 4,088,502
DATED : May 9, 1978
INVENTOR(S) : Richard G. LaBar

It is certified that error appears in the above-identified patent and that said Letters Patent are hereby corrected as shown below:

| | |
|---|---|
| Col. 3, line 35 | Change "optical" to --optional--. |
| Col. 4, line 23 | After "18" delete ")". |
| Claim 1, line 9 | Change "0.55%" to --0.5%--. |

Signed and Sealed this

Nineteenth Day of September 1978

[SEAL]

Attest:

RUTH C. MASON
Attesting Officer

DONALD W. BANNER
Commissioner of Patents and Trademarks